United States Patent [19]

Hales

[11] Patent Number: 4,648,361
[45] Date of Patent: Mar. 10, 1987

[54] HEATING DEVICE

[75] Inventor: Bernard C. Hales, Egham, England

[73] Assignee: Lucas Industries public limited company, Birmingham, England

[21] Appl. No.: 784,541

[22] Filed: Oct. 4, 1985

[30] Foreign Application Priority Data

Oct. 16, 1984 [GB] United Kingdom ................. 8426125
Jul. 2, 1985 [GB] United Kingdom ................. 8516691

[51] Int. Cl.$^4$ ............................................. F02N 17/02
[52] U.S. Cl. ................................. 123/179 H; 123/549; 123/550; 431/262
[58] Field of Search ................... 123/179 H, 549, 550; 431/260, 261, 262

[56] References Cited

U.S. PATENT DOCUMENTS

| 3,400,699 | 9/1968 | Van Kirk et al. | 123/179 H |
| 4,202,308 | 5/1980 | Skinner | 123/179 H |
| 4,380,218 | 4/1983 | Munro | 123/179 H |

FOREIGN PATENT DOCUMENTS 2131539 6/1984 United Kingdom ........... 123/179 H

Primary Examiner—Andrew M. Dolinar

[57] ABSTRACT

An electric starting aid for an internal combustion engine has a metal body having an integral tubular member about which is located a fuel pervious insulating sleeve. Surrounding the sleeve is an electric heating element. Fuel can be supplied to the interior of the tubular member and flows through an aperture and the sleeve, to the surface of the sleeve where it is vaporized by the sleeve to produce an ignitable air/fuel mixture.

8 Claims, 1 Drawing Figure

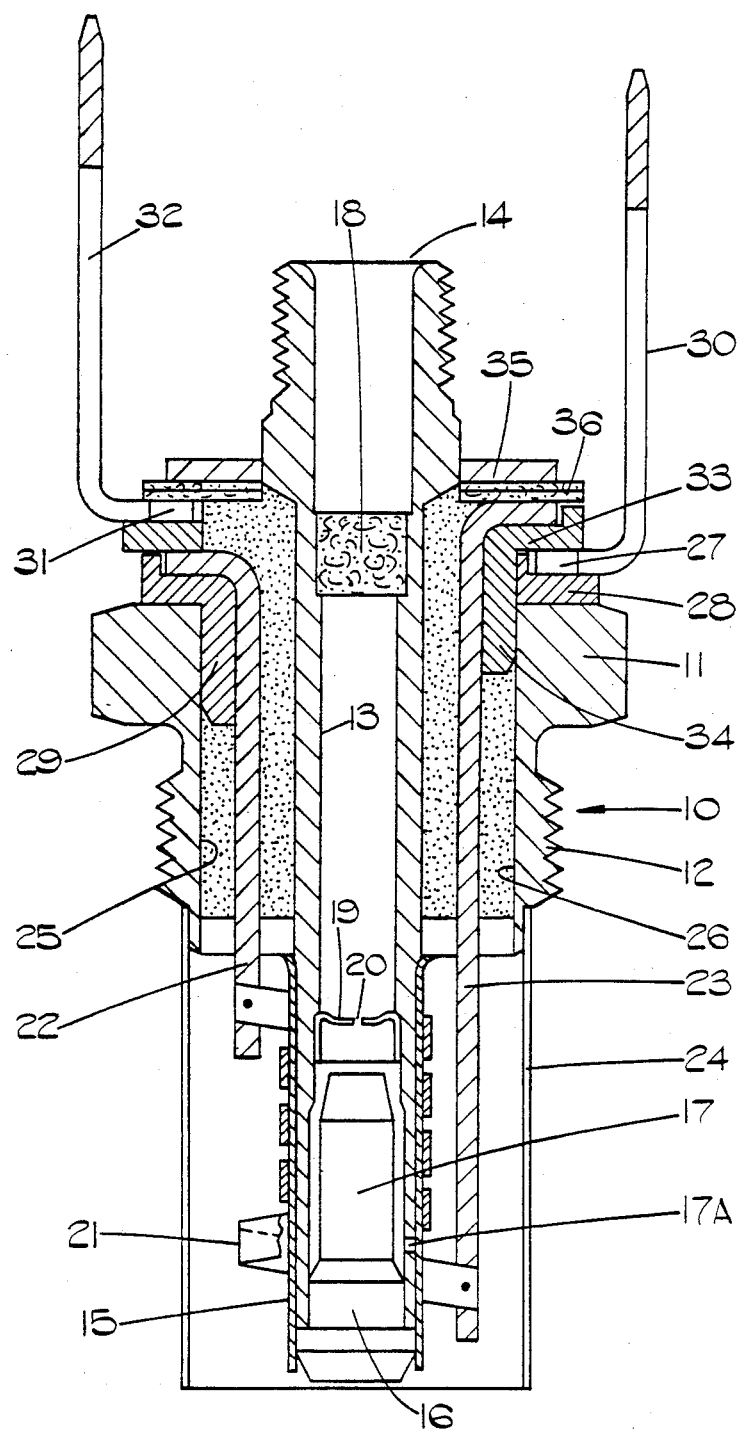

HEATING DEVICE

This invention relates to an electric starting aid for an internal combustion engine and of the kind in which liquid fuel is vaporized within the aid and is ignited, the resulting flame acting to heat the air flowing to the engine.

A known form of such a device comprises a body adapted to be secured in the air inlet manifold of an engine, the body mounting a tubular member about which is wound an electric heating element in the form of metal tape or wire. The interior of the tubular member in use is connected to a source of liquid fuel and in use fuel flows into the tubular member and onto the surface thereof through a suitable aperture and is vaporized and ignited by the heating element.

In known forms of starting aid the tubular member is coated with an electrically insulating frit, so that the turns of the heating element wound thereon will be insulated from the tubular member and from each other. The application of the frit to the surface of the tubular member involves considerable time and expense and furthermore, it is necessary to form the tubular member from a specific material such as stainless steel, which has a similar coefficient of thermal expansion to that of the frit. Apart from the fact that the material forming the tubular member is expensive, the tubular member does have to be secured within the body.

The object of the present invention is to provide an electric starting aid of the kind specified in a simple and convenient form.

According to the invention a starting aid for the purpose specified comprises a unitary metal body adapted to be secured in use in the air inlet manifold of the engine, said body part defining a reduced tubular end portion, a fuel inlet on the body communicating with said tubular end portion, means closing the end of said tubular end portion remote from the body, and through which in use fuel can flow to the exterior surface of said end portion, an electrically insulating sleeve located about said end portion, the sleeve being pervious to fuel, an electric heating element mounted about said sleeve, and means connected to the ends of the element to allow electric current to be passed therethrough, said heating element in use vaporizing fuel passing through the sleeve to form an ignitable air/fuel mixture.

An example of a starting aid in accordance with the invention is illustrated in sectional side elevation in the accompanying drawing. The starting aid comprises a metallic body generally indicated at 10 and which has a portion 11 of hexagonal profile. The body 10 is also provided with a threaded portion 12 whereby the aid can be secured in an air inlet manifold of the engine. The body has reduced integral tubular members or end portions at its opposite ends respectively and extending through the body and end portions is a bore 13. At one end the reduced end portion defines a fuel inlet 14 for connection in use to a source of liquid fuel. The opposite end portion of the body is longer than the aforesaid end portion and is provided with a monolithic electrically insulating sleeve 15 surrounding its outer peripheral surface. The sleeve 15 is pervious to fuel and conveniently is formed from woven glass fibre sold under the trade name "VIDAFLEX". Moreover, located within the aforesaid opposite end portion is a plug 16 having an integral part 17 which lies in spaced relationship with the surface of the bore 13.

Located within the bore at a position adjacent the inlet, is a filter 18 and downstream of the filter but immediately upstream of the part 17 is a cup-shaped member 19 in the base wall of which is formed a central orifice 20. Fuel supplied to the bore 13 through the inlet 14, passes through the orifice 20 and engages as a jet, the end surface of the part 17.

Surrounding the insulating sleeve 15 is an electric heating element in the form of a helically wound metal tape 21. The ends respectively of the tape are secured to terminal posts 22, 23 which extend alongside the sleeve but in spaced relationship thereto and these can be connected to a source of electric supply when the starting aid is required for use. A hollow thin walled shroud 24 is secured to the body and extends in spaced relationship about the terminal posts and the aforesaid end portion of the body. In use, with the heating element energised and a fuel supply connected to the inlet 14, the fuel flowing through the orifice 20 will flow through an aperture or apertures 17A in the end portion of the body and will also pass through the sleeve 15. The fuel is vaporized by the heating element and mixes with air within the space defined by the shroud. The resulting air/fuel mixture is ignited by a portion of the heating element which is spaced from the insulating sleeve and therefore is at a temperature sufficient to cause ignition of the air/fuel mixture.

The terminal posts 22, 23 extend through respective drillings 25, 26 which extend axially within the main part of the body 10. The terminal post 22 is integral with an annular washer 27 which is supported relative to the body 10 by means of a moulded insulator 28, the insulator adjacent the post 22 including a portion 29 which extends partly within the bore 25. The washer is integral with a terminal 30. The terminal post 23 is integral with a washer 31 which in similar manner is integral with a terminal 32 and the washer 31 is spaced from the washer 27 by means of an insulator 33 which is provided with a portion 34 extending partly within the bore 26. The insulators and washers are held in assembled relationship on the body by means of an annular retaining member 35 which is engaged with the end portion of the body which defines the inlet 14. Insulating washers 36 are interposed between the retaining member 35 and the washer 31. The washers 36 may be formed from any suitable material such as leatheroid and the insulators 28 and 33 may be formed from "Victrex" manufactured by Imperial Chemical Industries.

When assembly of the parts as described has been completed, the drillings 25 and 26 are filled with a material capable of resisting the high temperatures encountered during the use of the starting aid conveniently, a high temperature epoxy casting resin.

A starting aid of the construction described has the aforesaid end portions and in particular the end portion which carries the heating element, formed from the same material as the main portion of the body and is integral therewith. The need for forming the tubular member from a special material, coating it with insulation and securing it within the body is removed and the manufacture of the aid is therefore simplified.

I claim:

1. An electric starting aid for an internal combustion engine and of the kind in which liquid fuel is vaporized within the aid and is ignited to provide a flame for heating air flowing to an engine, the aid comprising a unitary metal body adapted to be secured in use in the air inlet manifold of the engine, said body part defining a reduced tubular end portion, a fuel inlet on the body communicating with said tubular end portion, means closing the end of said tubular end portion remote from the body, and through which in use fuel can flow to the exterior surface of said end portion, a monolithic electrically insulating sleeve located about said end portion, the sleeve being pervious to fuel so that fuel flowing to the exterior surface of said end portion flows into and through said sleeve, said monolithic sleeve extending continuously from adjacent to the body to adjacent to said means closing the end of said tubular end portion, an electric heating element mounted about said sleeve, and means connected to the ends of the element to allow electric current to be passed therethrough, said heating element in use vaporizing fuel passing through the sleeve to form an ignitable air/fuel mixture.

2. A starting aid according to claim 1 in which said sleeve is formed from woven glass fibre.

3. In a starting aid for assisting the starting of an internal combustion engine and of the kind which is located in the air inlet manifold of the engine and to which liquid fuel is supplied, the fuel being vaporized and ignited so that a flame is produced which heats the air flowing to the engine, the aid comprising a tubular body which is closed at one end and has a fuel inlet at the other end of the body, an electrical heating element, an aperture in the wall of said body and through which fuel can flow to peripheral surfaces of the tubular body, said element acting to vaporize the fuel and means for igniting the vaporized fuel, the improvement in combination therewith comprising: a monolithic fuel pervious sleeve located on the tubular body between the tubular body and the electrical heating element, said sleeve extending continuously for essentially the entire length of the tubular body covered by the electrical heating element.

4. The starting aid defined in claim 3 wherein the improvement further includes pores in said monolithic sleeve through which fuel from said aperture flows.

5. The starting aid defined in claim 4 further including a main body protion and the improvement further comprising the tubular body being monolithic with said monolithic sleeve extending from adjacent to said main body portion.

6. The starting aid defined in claim 5 wherein the improvement further comprises said monolithic sleeve being formed of woven glass fibre.

7. The starting aid defined in claim 3 wherein the improvement further comprises a terminal post extending alongside said sleeve in spaced relationship thereto, said electrical heating element having a portion extending from adjacent to said monolithic sleeve and being connected to said terminal post by said heating element extending portion at a location downstream of the aperture, said heating element extending portion being located in the path of fuel flowing from the aperture and through said monolithic sleeve.

8. The starting aid defined in claim 7 wherein said improvement further includes means for maintaining said heating element extending portion at a temperature sufficient to ignite fuel contacting said heating element extending portion.

* * * * *